United States Patent
Dang et al.

(10) Patent No.: US 9,955,232 B2
(45) Date of Patent: *Apr. 24, 2018

(54) METHODS AND APPARATUS FOR DYNAMIC MANAGEMENT AND BANDWIDTH ALLOCATION FOR CONTENT DELIVERY

(71) Applicant: TIME WARNER CABLE ENTERPRISES LLC, New York, NY (US)

(72) Inventors: Niem Dang, Sterling, VA (US); John Chen, Broadlands, VA (US); John Gabriel, Purcellville, VA (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/412,984

(22) Filed: Jan. 23, 2017

(65) Prior Publication Data

US 2017/0201806 A1 Jul. 13, 2017

Related U.S. Application Data

(63) Continuation of application No. 13/710,108, filed on Dec. 10, 2012, now Pat. No. 9,571,896.

(51) Int. Cl.
*H04N 7/173* (2011.01)
*H04N 21/643* (2011.01)
*H04N 21/24* (2011.01)
*H04N 21/266* (2011.01)
*H04N 21/462* (2011.01)
*H04N 21/61* (2011.01)
*H04N 21/6408* (2011.01)
*H04H 60/82* (2008.01)
*H04H 60/06* (2008.01)

(52) U.S. Cl.
CPC ...... *H04N 21/64322* (2013.01); *H04H 60/06* (2013.01); *H04H 60/82* (2013.01); *H04N 21/2407* (2013.01); *H04N 21/26616* (2013.01); *H04N 21/4622* (2013.01); *H04N 21/6125* (2013.01); *H04N 21/6408* (2013.01)

(58) Field of Classification Search
CPC ................. H04N 21/266; H04N 21/26616
See application file for complete search history.

(56) References Cited

U.S. PATENT DOCUMENTS

2013/0067523 A1* 3/2013 Kamitakahara ...... H04N 21/654
725/96

* cited by examiner

*Primary Examiner* — Gigi L Dubasky
(74) *Attorney, Agent, or Firm* — Straub & Straub; Michael P. Straub; Stephen T. Straub

(57) ABSTRACT

Methods and apparatus for content delivery and managing and conserving network bandwidth in a content delivery system are described. In accordance with one aspect of some embodiments, when the number content playback devices, e.g., IP set top boxes, iPADs, etc., in a region or service group receiving the same program content via individual unicast streams over a first network, e.g., cable network, exceeds a threshold number large, the IP capable playback devices are instructed to switch to receive the same programming content from a local device, e.g., a gateway device, via a home network. The local device receives the programming content via the cable network over a broadcast or SDV or VOD channel established by the cable service provider's headend/hubsite.

18 Claims, 4 Drawing Sheets

METHODS AND APPARATUS FOR DYNAMIC MANAGEMENT AND BANDWIDTH ALLOCATION FOR CONTENT DELIVERY

RELATED APPLICATIONS

The present application is a continuation of U.S. patent application Ser. No. 13/710,108 which was filed Dec. 10, 2012 and which is hereby expressly incorporated by reference in its entirety.

FIELD OF THE INVENTION

The present invention relates to content delivery methods and apparatus and more particularly to methods and apparatus for managing network bandwidth in a content delivery system including one or more gateway devices including a cable network interface and an IP network interface.

BACKGROUND OF THE INVENTION

Unicast IP (Internet Protocol) content delivery is preferred in many cases for content delivery to IP capable devices such as computers, tablets and/or other devices coupled to a home network. This is because unicast IP supports acknowledgements allowing the IP devices to signal the failure to properly receive a packet and also allows the transmitting device to send a content stream, e.g., a video content stream, which has been encoded in a manner that is particularly well suited for the receiving device and at a rate which can be supported.

For example, the same content but encoded using different coding schemes may be sent to IP devices with differing capabilities. The content may be transmitted at a high data rate to a first device with a powerful processor being able to receive, process and decode the high data rate version of the content. At the same time a low data rate version may be sent to another device, e.g., a handheld device with a small display, limited processing power and a low data rate connection, e.g., a WiFi connection to a cable modem where the WiFi connection has limited or poor signal quality and thus constrained bandwidth capability.

In order to support a wide range of data rates and devices, the content provider may code the same content multiple times using different encoding schemes and for different data rates. The coder used to code the content supplied from the network headend or another content server maybe a relatively powerful and expensive device which does high quality encoding. This is commercially possible given that the content coded for delivery from the network headend or content server is likely to be provided to numerous devices with the cost of the coder being a cost that is effectively shared over multiple devices.

While unicast IP content delivery is desirable for many reasons, it has the potential to place a large burden on the delivery network extending from the content server or network headend from which the content is streamed to various household which may share one or more links to the content server providing the content. This is particularly common where a cable network is used to stream content to one or more households but also occurs in the case of delivery via a fiber network.

As networks move towards increased unicast IP content delivery the potential loading on the networks links between a content server and one or more households is likely to increase. While demand for unicast IP content delivery is likely to increase, the demand for content delivery via Switched Digital Video, analog broadcasts and/or other non-unicast delivery methods is likely to decrease over time as more and more devices switch to unicast content delivery with the content normally being expected to be supplied via a server.

Thus, over time, the demand on a cable network's non-unicast content delivery capability is likely to decrease as the demand for unicast IP content delivery increases.

In many households, gateway devices capable of receiving content via conventional cable services such as Switched Digital Video, Video on Demand, Analog broadcast and/or types of content channels used to deliver the same content stream to multiple households are being deployed. Such gateway devices normally support recording, transcoding and/or transrating capabilities and can receive content via a cable network channel and generate an IP unicast stream therefrom which can be delivered over a home network or another network coupled to the gateway device.

While gateway devices often support transcoding and/or transrating capability, the quality of the coders in home gateway devices is often relatively poor compared to those used to encode content placed on content servers which will supply content to numerous households. In addition, while a content server may support a large number of different encoding formats and data rates allowing the best match with a particular end device's capabilities, home gateway devices often support fewer encoding schemes and/or data rates. As a result of a home gateway's limited ability to encode and support a wide variety of encoding schemes, the quality of video received from a home gateway often appears inferior to that streamed from a content server that serves multiple households.

While some content may be broadcast over a cable network according to a transmission schedule, in many cases content being supplied via unicast IP streams may not be delivered via a broadcast or other non-IP unicast content delivery method at the time it is being supplied via unicast IP to one or more devices.

As the number of devices requesting content via unicast IP content delivery streams increases the chance that congestion will occur on a shared link also increases. At the same time the probability that multiple devices in a household, region, or service group supplied via a common network link will be requesting the same content at a particular point in time also increases. This is particularly the case where a hometown or regional sporting event may be the cause of the high demand on a particular link.

In view of the above discussion, it should be appreciated that there is a need for developing methods and/or apparatus which would help in alleviating congestion over the service provider's delivery network by reducing and/or avoiding the number of devices to which unicast content streams need to be delivered via a shared or common network link. As noted above, cable and fiber network are particularly likely to encounter such a congestion situation since a shared link may service many households.

SUMMARY OF THE INVENTION

Methods and apparatus for content delivery and managing and conserving network bandwidth in a content delivery system are described. The methods and apparatus are particularly well suited for use in a cable network or other type of network where one or more households are likely to include gateway devices cable of receiving content on a broadcast or other channel used to supply content to multiple households and generate an IP unicast content stream therefrom for delivery to IP devices located at the household.

In various embodiments a cable headend, e.g., content server located at a cable headend, supplies content via unicast streams. The supplied content is supplied using one of a plurality of coding schemes and/or data rates. Thus the headend supplies content coded for different devices in unicast IP stream with each unicast stream communicating content in a format that is well suited for the IP device receiving the unicast content stream. Thus, the same content may, and sometimes is, provided to multiple devices at the same time with the content being encoded differently for different devices.

In response to network congestion, in order to relieve the congestion, the headend and/or content delivery server may, and in some embodiments does, switch from unicast content delivery methods to a QAM broadcast delivery or SDV delivery method. The switch is performed on a regional or other group basis in response to network congestion on a link with regions not subject to congestion continuing to receive content via unicast content delivery streams. For example, in some embodiments households in an area or region are subdivided into what are sometimes called service groups where a service group may be a group of households serviced by a cable plant or headend.

The context of service groups can be understood in the context of an overall hierarchy of groupings used in some cable systems. In one exemplary cable system the cable system includes a National Data Center. In addition to the national data center the exemplary cable system includes various Market Data Centers which are Regional Data Centers which are beneath the national data center in terms fo the cable system hierarchy. The Market Data Centers may be multi-state in nature or cover an area corresponding to a single state or portion of a state in more densely populated areas. Underneath the Market Data Centers in terms of a deployment hierachry are what are sometimes referred to as Areas. Areas are locations that are also referred to sometimes as divisions and often correspond to a single headend. An Area corresponding to a headend may be further divided into what are sometimes referred to as Service Groups. A service group corresponds to a small grouping of households, e.g., hundreds of households in some embodiments. An exemplary service group may correspond to, e.g., a region or geographic area including, for example 500 households with a subset of the households subscribing to cable service. For example, a service group may correspond to a geographic region with 500 households and a subscriber penetration of 60%. In such a case there would be 300 subscribers (households) in the exemplary service group.

While various embodiments are described in terms of service to a region, it should be appreciated that the methods and apparatus of the present invention are applicable at the service group level and that the discussion and examples with regard to the methods being applied to a region can and in some embodiments are applied at the service group level.

In order to enable the switch to the QAM broadcast delivery or SDV delivery method, a content transmission using one or both of these methods may be initiated at the headend, e.g., at a VOD, broadcast or SDV server located in the headend. Thus, content which may not have been provided via unicast delivery at the time network congestion is detected will begin being delivered via one or more of these alternative delivery techniques. If the content is being supplied via both unicast IP and one or more of these alternative delivery techniques there may not be a need to initiate the alternative content delivery method in response to detecting network congestion because it is already ongoing.

Devices in regions and/or service groups which are subject to network congestion and located at a customer premise with a gateway device are switched from receiving content from the network based unicast content server to receiving an IP content stream from the gateway device located at the customer premise.

The gateway device at the customer premise receives the content to be delivered to the IP capable device via a broadcast channel, SDV channel or other channel which is received by multiple devices. The received content is then transcoded and/or transrated by the gateway device, packetized and streamed to the IP device at the customer premise via a local network. Once content is being supplied via the gateway device at a customer premise the unicast stream from the network content server is terminated. As multiple IP devices are served by the gateway devices at the customer premise which receive content via a common channel and unicast content streams from the network content server are terminated, network congestion is reduced.

It should be appreciated that the input to the gateway devices can be a relatively high data rate stream as compared to the unicast steams supplied to individual devices subject to network congestion and can be of relatively high quality. While the content input to the multiple gateway devices at different customer premises is provided in a single encoding format, which may be different than the encoding format supported by the IP device or devices to which the content is to be streamed for playback, the transcoding and/or transrating functions of the home gateway devices allow the gateways to generate the IP content streams to be delivered to the IP devices from the received input.

While the encoder used at the gateway device may not be as powerful as the encoder used to code content delivered by a network content server, the gateway device may be able to receive content and output content, e.g., transcoded content, at a higher data rate than the network connection could supply via unicast content streams to the IP devices suffering from network congestion. Thus the content stream output by the gateway device may be a higher data rate stream than that which could be obtained if unicast content delivery was used via the cable network suffering from congestion. The higher data rate may, and often does offset for the potentially lower quality of the coder in the gateway device making gateway transcoding and/or transrating operations preferable to low bandwidth content delivery which might otherwise occur due to network congestion if unicast content delivery from the network based content server was used.

IP devices which are located at customer premises which do not include a gateway device continue to be served by unicast content delivery streams even after one or more other IP devices which are coupled to a gateway are switched to content delivery via the gateway device and a common shared channel used to supply content to the gateways in the region and/or service group. Thus, while some devices in a region/service group may continue to be served via unicast streams after other devices are switched to delivery via a gateway, network congestion overall is still reduced. Furthermore the data rates which can be supported for the devices being serviced via unicast content delivery streams, after some of the devices are switched to receiving content via the local gateway device, can be maintained or even increased.

The decision as to which content steams should be switched to gateway delivery based methods may, and in some embodiments is, based on the number of devices receiving a particular piece of content, e.g., sports broadcast or television program, via unicast content delivery streams in the region/service group subject to congestion.

In accordance with one aspect of some embodiments, when the number IP capable content playback devices, e.g., IP set top boxes, iPAD, cell phones etc., in a region/service group receiving the same program content via individual unicast streams over a communications network, e.g., cable network, becomes large, e.g., above a threshold number, the IP capable playback devices are instructed to switch to receive the same programming content from a local device, e.g., a gateway device, via a local network, e.g., home network, wherein the local device, e.g., gateway, receives the programming content from the cable service provider's headend or hubsite via the cable network over a common channel used to supply content to multiple gateway devices, e.g., a broadcast channel, and SDV channel or a VOD channel. The region could include a customer premise or a plurality of premises with content playback devices. The region may, and in some embodiments does, correspond to a single service group. In other embodiments a region may correspond to or include multiple service groups.

In various embodiments an IP content server normally supplies individual unicast IP program content streams to various IP content playback devices served by the IP content server. The IP content server tracks the program content being supplied via unicast IP content streams over the cable network to each of the IP content playback devices located in a region, e.g., a customer premise. In some embodiments when it is detected that the IP content server is supplying the same content to more than a threshold number of IP playback devices in a region via individual IP content streams over the cable network and/or when network congestion is detected, then in accordance with a feature of the invention a QAM broadcast or SDV channel is established to deliver the program content to a local QAM device, e.g., a gateway device, in that region instead of the same content being delivered via individual unicast IP content streams to each of individual content playback devices in the region which wastes network bandwidth. In various embodiments the local gateway device then generates content streams and delivers the content streams to these individual devices over a local network, e.g., home network.

In various embodiments the local device is e.g., a gateway device, with multiple tuners and demodulators and multiple network interfaces, e.g., a first network interface such as a cable network interface and a second network interface such as a local, e.g., home network interface. The gateway device may also include a transcoder and/or transrating module in addition to a packetizer for packetizing content received via the first network which is not already packetized. In at least some embodiments the transcoder performs both transcoding and transrating functions allowing the gateway device to recode and output content received via the first network, e.g., cable network, over the second network, e.g., after packetization by the packetizer. Thus, the gateway device can receive content via the first network and process it to the extent necessary before providing it to one or more devices on the local network. As will be discussed below, the gateway device is used in some embodiments to generate unicast content streams for a plurality of playback devices at the customer premise where the gateway device is located and provide individual unicast program content streams to the playback devices via the local home network. In some embodiments the home network is, e.g., an Ethernet network, a WiFi network or another local home network.

Thus, in various embodiments a gateway device located at the same customer location as the content playback devices, receives program content via a QAM broadcast or SDV channel over the cable network from the headend/hubsite and provides the programming content to the playback devices at the customer premise via home network without requiring an IP content server to send out individual unicast IP streams over the cable network to each content playback device.

It should be appreciated that numerous additional variations and embodiments are possible and remain within the scope of the invention. Various features and embodiments will be discussed further in the detailed description which follows.

Numerous additional features, embodiments and benefits are described in the detailed description which follows.

Various additional features and advantages of the present invention are discussed in the detailed description which follows.

DETAILED DESCRIPTION

Figure 1:
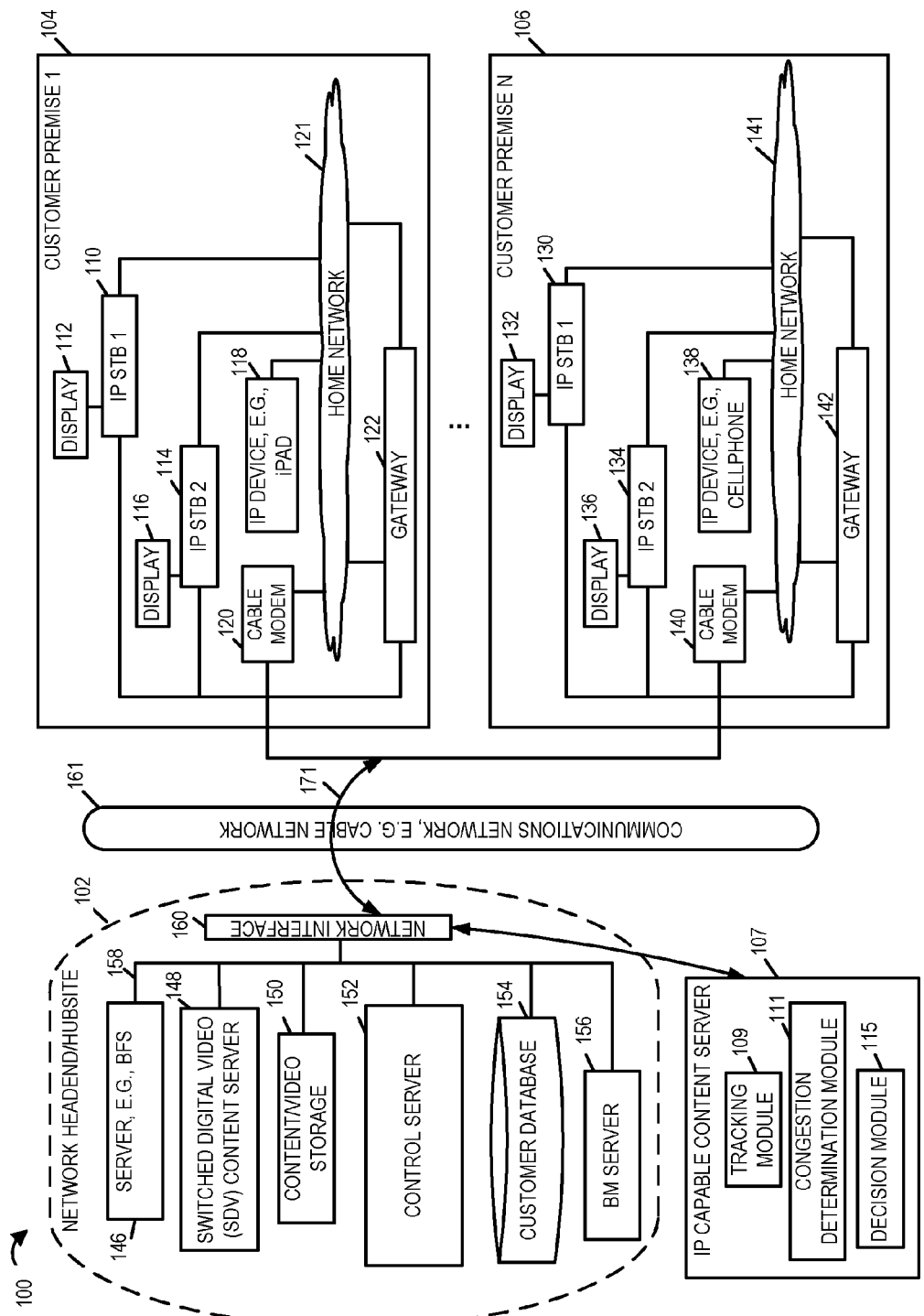
FIG. 1 illustrates an exemplary system implemented in accordance with the some embodiments of the present invention.

FIG. 1 illustrates an exemplary system 100 implemented in accordance with one exemplary embodiment of the present invention. The system 100 supports delivery of content to customer premise equipments (CPEs) including content playback devices in accordance with various embodiments of the invention. The system 100 includes a network headend/hubsite 102, a cable network 161, e.g., a hybrid fiber-coaxial (HFC) network and/or internet, an IP capable content server 107, and a plurality of customer premises 104, 106. In various embodiments the content, e.g., multimedia content, is delivered from the headend/hubsite 102 and/or IP content server 107 over the cable network 161 to one or more CPEs in the customer premise 104, 106. As will discussed, in some embodiments, the content playback devices at the customer premises are IP (internet protocol) capable, that is, they support communications over IP.

The network headend/hubsite 102 may be implemented at a cable network office or hubsite serving a plurality of customer premises and includes multiple servers and databases which are coupled together as shown. In the FIG. 1 example, the headend/hubsite 102 includes a content server, e.g., a broadcast file server (BFS) and/or a video on-demand (VOD) server 146, a switched digital video (SDV) content server 148, a content storage 150, a control server 152, a customer database 154 and a business management server 156. It should be appreciated that some of the servers and/or elements shown to be included in the headend/hubsite 102 may reside outside the headend/hubsite 102 in some embodiments and may be located anywhere in the system 100, e.g., in a distributed manner. In the FIG. 1 example, various servers and other elements included in the headend/hubsite 102 are coupled together by a local network 158. The local network 158 is coupled via one or more network interfaces 160 to other networks and/or devices. For example, the headend/hubsite 102 is coupled via network interface 160 to communications network 161, e.g., a cable network, and may also be coupled to one or more other external networks. In some embodiments system 100 may also include one or more mobile network(s) including one or more base stations (BS) for supporting communications, e.g., delivery of content and/or other signaling, with mobile devices such as cell phones.

Via the cable network 161, the IP content server 107 and the elements shown in the network headend/hubsite 102 can send and/or exchange various information with the devices located at the customer premises 104, 106. As shown in FIG. 1, communications link 171 traversing the cable network 161 couples the CPEs at the customer premises 104, 106 to the various elements/servers shown in the network headend/hubsite 102 and to the IP content server 107.

The content server 146, e.g., a broadcast file server (BFS), among other things, is responsible for delivering, e.g., broadcast, programming content including video on-demand content ordered by one or more customers and/or other information to one or more content playback devices which support receiving content by tuning to, e.g., QAM broadcast stream broadcasted by the server 146. The switched digital video (SDV) content server 148 provides digital programming content to one or more content playback devices which support receiving SDV content. In various embodiments the content servers 146, 148 access the programming content from the content storage 150 and generate transport streams suitable for delivery to various CPEs via the communications network 161. The content storage 150 stores content, e.g., audio, video and/or other multimedia content. In some embodiments the content stream is encrypted prior to delivery to the CPEs over the communications network 161.

The control server 152 in some embodiments is configured to control the BFS server 146 to establish a QAM broadcast channel or VOD delivery channel and control the SDV server 148 to establish an SDV content delivery channel for delivering program content to one or more gateway devices in accordance with one feature of some embodiments of the invention. In some embodiments the control server 152 instructs the BFS and/or SDV server to establish the content delivery channels when network congestion is detected. In some embodiments the IP content server 107 requests the control server 152 to establish one of the QAM broadcast channel, or SDV delivery channel or VOD delivery when network congestion is detected in a region or service group.

The customer database 154 includes, for a plurality of customers, customer information, account information and information regarding the devices installed at customer premises. In some embodiments customer account information includes, e.g., customer account number, customer subscription/service information, customer device capability and other billing related information. Customer database 154 also includes customer device information, e.g., identification and/or other information regarding customer devices such as gateway devices, STBs, cable modems etc., installed at various customer premises served by the headend/hubsite 102.

BM (Business management) server 156 processes billing information corresponding to customers serviced by the headend/hubsite 102. This may include updating billing charge information in response to changes in services being provided to the customer, upgrades, on-demand content purchases, and/or other activity. Business management server 156 also processes services bill payment information, e.g., bill payment transactions, deductions from debit accounts, mail bills, and/or processes discount and/or other information.

Referring now to the customer premises shown in the system. Each customer premise 104, 106 may include a plurality of CPEs including content playback devices. In various embodiments the CPEs located at the customer premises include, e.g., gateways, modems, routers, and content playback devices including, e.g., set top box, internet capable TVs, personal computers, laptops, tablet devices, smart phones etc. In various embodiments a content playback device presents the program content to a viewer, e.g., a customer/subscriber. In FIG. 1 embodiment, customer premise 104 includes a plurality of IP capable playback devices including IP STB1 110 coupled to display device 112, and IP STB2 114 coupled to a display device 116 and an IP device 118, e.g., an iPAD, a cable modem 120 and a gateway device 122. It should be appreciated that in some embodiments content playback devices can be integrated in a device which also includes a display. The content playback devices, e.g., STBs 110, 114 and the IP device 118, the cable modem 120 and the gateway device 122 are coupled to the local home network 121 over which they communicate and exchange information. The display devices could be, e.g., standard televisions. In various embodiments the IP capable content playback devices 110, 114 and 118 receive IP program content streams from the IP content server 107. The IP capable device 118, could be any of a variety of devices that support communications over IP, e.g., cell phones, tablet devices such as iPAD, computers etc.

Similarly, customer premise 106 includes a plurality of IP capable playback devices including IP STB 130 coupled to display device 132, and IP STB 134 coupled to a display device 136 and an IP device 138, e.g., a cell phone capable of receiving multimedia content over IP, a cable modem 140 and a gateway device 142.

In various embodiments the IP content server 107 supplies unicast IP program content streams to various IP content playback devices served by the IP content server 107. The IP content server 107 includes a tracking module 109 for tracking the program content being supplied via unicast IP content streams over the cable network to each of the IP content playback devices located in a region, e.g., a customer premise or a plurality of customer premise locations. The plurality of customer premises may correspond to a service group which shares a common channel at some point in the distribution process. The tracking module 109 determines the number of playback devices in a region or service group receiving content corresponding to a program, e.g., TV show, movie, sports event etc., via unicast content delivery. In various embodiments the IP content server 107 further includes a congestion determination module 111 configured to determine network congestion based on at least one of: signals indicating unicast packet transmission delays or signals requesting that the IP content server transmitting unicast packets switch to using a lower transmission data rate. The IP playback devices at customer premises 104, 106 may signal the IP content server 107 to begin using a lower transmission data rate if they experience impaired connectivity to the IP content server or loss in reception due to network congestion and the determination module 111 can then determine from multiple such requests in a particular region or service group that a particular network region or service group is encountering network congestion. The IP content server 107 further includes a decision module 115 configured to make a decision whether one of a QAM broadcast program channel, or a VOD content delivery channel, or a SDV content delivery channel for delivering a second portion of the program should be established based on the number of playback devices in the region or service group receiving content corresponding to said program via unicast content delivery. In some embodiments when network congestion is detected in the region or service group and the number of playback devices in the region or service group receiving content corresponding to the program exceeds a threshold number, the decision module makes a decision that one of a QAM broadcast program channel or a SDV content delivery channel should be established and sends a request to the control server 152.

In accordance with one aspect when it is detected that the same content is being supplied by the content server 107 to more than a threshold number of IP playback devices in a region via individual IP content streams over the cable network 161, in accordance with a feature of the invention the headend/hubsite 102 establishes a QAM broadcast or SDV channel to deliver the program content to a local device, e.g., gateway device 122, in that region instead of the same content being delivered via individual unicast IP content streams to each of individual content playback devices in the region which wastes network bandwidth. The local gateway device then generates content streams and deliver the content streams to these individual playback devices over a local network, e.g., home network, and the IP content server ceases to supply the program content via unicast IP streams to these playback devices. The region may include a customer premise or a plurality of premises with content playback devices.

Figure 2:
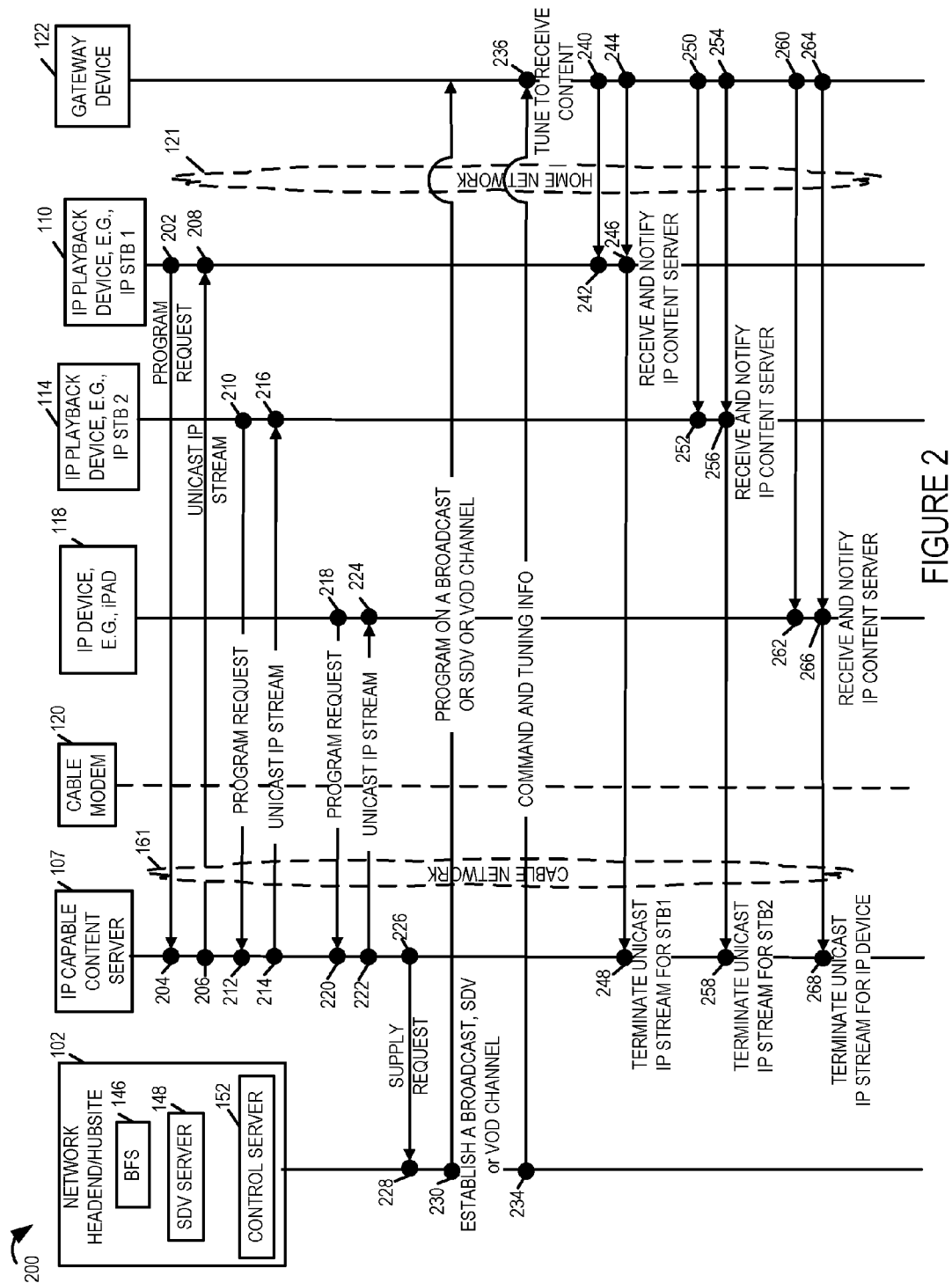
FIG. 2 illustrates the steps and associated signaling exchange between various devices performed in an exemplary embodiment implemented using the system shown in FIG. 1.

Having generally discussed the exemplary system shown in FIG. 1, an exemplary method will now be discussed in detail with regard to the example shown in FIG. 2. Elements of the system 100 shown in FIG. 1 which participate in the method being described in the FIG. 2 example are shown at the top of FIG. 2 and bear the same reference numbers as used in FIG. 1. Messages, information, content and/or signals communicated between devices are represented in FIG. 2 using arrows.

At the top of FIG. 2, various elements 200 of the system 100 which may participate in the exemplary content delivery method in accordance with one embodiment of the invention, are shown. The illustrated components 200 include the network headend/hubsite 102, IP content playback devices including, IP STB1 110, IP STB2 114, and IP device 118, cable modem 120 and the gateway device 122. The BFS 146, SDV content server 148 and control server 152 included in the headend/hubsite 102 are also shown.

FIG. 2, illustrates the steps and associated signaling used in one exemplary embodiment where a plurality of content playback devices, e.g., used by customers, located at a customer premise, e.g., CP 104, that are initially receiving the same program content from the IP content server 107 via individual IP content streams over the first network, e.g., cable network 161, are controlled to switch to receive the program content from the gateway device 122 over the home network 121 which received the program content from the headend/hubsite content servers via a QAM broadcast or SDV channel in accordance with the invention. The example illustrated in FIG. 2 shows the IP content playback devices and the gateway device located at a single customer premise to simplify illustration however this is not limiting in any way and rather in various embodiments the method is applicable and used in regions with multiple customer premises having content playback devices.

The process starts in step 202 where the IP capable playback device IP STB1 110 sends a request for program content g to the IP content server 107. The sending of content request may be triggered, e.g., when a user selects a program, e.g., from the program guide or otherwise, to watch. The program may be e.g., a television show, news, movie, sports event etc. For the purpose of discussion consider that the requested program is a popular show or movie or sports match which is scheduled to be on. In step 204 the IP content server 107 receives and processes the request to identify the requested program content and the requesting device. In step 206 the IP content server 107 generates a unicast IP content stream suitable for the requesting IP STB 110 and starts supplying a first portion of the requested program via the unicast IP content stream to the IP STB 110. Further in step 206 the IP content server updates a tracking record indicating what program content is being supplied to IP STB 110. The IP STB 110 starts receiving the IP content stream in step 208. In accordance with one feature of various embodiments the IP content server 107 tracks what content is being supplied to a requesting device. Thus the IP content server 107 keeps a record of the program content being supplied along with the information of the IP device to which the content is being supplied.

Next in step 210 a second IP content playback device, e.g., IP STB 114, sends a request for program content corresponding to the IP content server 107. Consider that the IP STB 114 requests the same content as being supplied to the IP STB 110. In step 212 the IP content server 107 receives and processes the request to identify the requested program content and the requesting device. In step 214 the IP content server 107 generates an IP content stream suitable for the requesting IP STB 114 and starts supplying a first portion of the requested program via the unicast IP content stream to the IP STB 114 and updates a tracking record indicating what program content is being supplied to IP STB 114. The IP STB 114 starts receiving the content stream in step 216.

In step 218 it is illustrated that the IP device 118 sends a content request to the content server 107. In step 220 the IP content server 107 receives and processes the request to identify the requested program content and the requesting device. In some embodiments the IP device 118 communicates with the external servers, e.g., the IP content server 107, through the cable modem 120. Following the receipt and processing of content request in step 220, in step 222 the IP content server 107 generates and starts supplying a first portion of the requested program via the unicast IP content stream to the to the IP device 118 and updates the tracking record indicating the program content is being supplied to IP device 118. The IP device 118 starts receiving the content stream in step 224. Although in the example it is illustrated that the IP playback devices 110, 114, 118 receive the individual unicast IP streams program sequentially, this is not necessary and in fact the receiving of unicast IP stream by one IP playback device is independent of when another IP playback device in the region receives. The IP playback devices may even be receiving the unicast IP streams more or less at the same time in some scenarios. Consider that the content requested by the IP device 118 is the same programming content as requested by the IP STBs 110 and 114 since we assume that the requested program content is a popular program which indicates that a lot of customers, e.g., in a region served by the IP content server 107, are likely to be interested in viewing the program. For example, during the super bowl season it is likely that at the time of a game, e.g., a finale or say a match between two popular teams, a large number of content playback devices in a given area are likely to request the content corresponding to the match. However such a scenario is likely to cause bandwidth wastage and network congestion due to a large number of unicast content streams going over the network 161. This is likely to cause transmission errors and/or deteriorate viewing experience.

In accordance with one aspect of the invention when such a situation is detected, e.g., network congestion due to the number of devices in a given region, e.g., at customer premise 104, receiving unicast IP streams providing the same content reaching or exceeding a threshold number, then the headend/hubsite 102 establishes, e.g., a QAM broadcast or SDV or VOD content delivery channel, to deliver the same program content in a single content stream over the cable network 161 to the customer premise 104. In various embodiments the content stream from the headend/hubsite is received and processed by a local device, e.g., gateway device 122, and the content playback devices are instructed to switch to receive the same program content from the gateway device 122 over the home network 121.

Detecting network congestion due to the number of unicast IP streams supplying the same content to various IP devices exceeding a threshold number, in step 226 the IP content server 107 sends a supply request to the control server 152 at the headend/hubsite 102, the supply request being a request to supply a requested program content to a given region via broadcast or SDV or VOD channel. In various embodiments the switching request includes information identifying the requested program, and identification information corresponding to the region and/or customer and/or the gateway device which is supposed to receive the program content. The control server 152 at the headend/hubsite 102 receives and processes the supply request in step 228. Further in step 228 the control server 152 sends a control signal to the BFS 146 and/or SDV 148 to establish a channel and supply the program content. Depending on what is deemed more suitable, one of the BFS 146 or the SDV server 148 assumes the responsibility to provide content.

In step 230 one of a QAM broadcast program channel, an SDV content delivery channel or a VOD channel is established for delivering the program content, and at least one of the content servers at the headend/hubsite 102 starts supplying the program content, e.g., a second portion of the program, to the gateway device. In various embodiments the second portion of the program being a portion of the same program which was supplied to the one or more IP content playback devices at the customer premise 104 via unicast IP streams. In step 234 the BFS 146 or the SDV server 148 sends a command including the tuning information to the gateway device 122 so that it can tune to and receive the program content being supplied. The command instructs the gateway device 122 to tune to the established content delivery channel (one of the QAM broadcast channel, an SDV content delivery channel or the VOD channel) and supply the received content to one or more devices, e.g., IP playback devices 110, 114 and 118, over the home network 121. Thus in some embodiments the gateway device is provided information identifying the devices on the home network to which the gateway device is to supply the program content over the home network.

In step 236 the gateway device receives the tuning information, tunes to the channel over which the content in being supplied and starts receiving the program content. Following the receipt of program content the gateway device 122 recovers the second portion of said program from content received via the QAM broadcast program channel, VOD channel or SDV content delivery channel.

In step 240 the gateway device 122 sends a command to the IP device 118 instructing the IP device to switch from receiving content from the IP content server 107 to receiving the program content from the gateway device 122 over the home network 121. In step 242 the IP device 118 receives and processes the command. In some embodiments the IP device 118 sends an acknowledgment signal to the gateway device 122 confirming that it is ready to start receiving the content from the gateway device 122. In step 244 the gateway device 122 generates a unicast IP stream for delivering at least a portion of the second portion of the program to the IP device 118 and sends the generated unicast IP stream over the home network 121 to the IP device 118. In some embodiments in step 244 the gateway device 122 generates unicast packets from said recovered second portion of the program and transmits at least some of said unicast packets to the IP device 118. In some embodiments generating unicast packets from the recovered second portion of the program includes coding the recovered content according to a first coding standard supported by the IP device 118 and packetizing recovered content coded according to the first coding standard. For example if the IP device 118 is e.g., an iPAD, then the first coding standard may be a coding standard which is best suited for coding data to be transmitted to an iPAD device over the home network, e.g., over Ethernet, WiFi etc. In various embodiments transmitting at least some of said unicast packets to the IP device 118 includes streaming unicast packets including recovered content coded according to said first coding standard to the IP device 118.

In step 246 the IP device 118 starts receiving the unicast IP content stream delivering packets generated from the recovered second portion of the program over the home network 121 from the gateway device 122. The IP device 118 switches from outputting the content received from the IP content server 107 to outputting the program content received over the home network 121 from the gateway device 122. Outputting the content includes, e.g., displaying the program content on a display screen. Further in step 246 the IP device 118 sends a notification over the cable network 161 to the IP content server 107 notifying the IP content server 107 that the IP device has started receiving the program from the gateway device 122. In step 248 the IP content server 107 receives and processes the notification signal and terminates the unicast IP stream being supplied to the IP device 118. Thus it should be appreciated that the IP content server 107 terminates at least some of the unicast IP streams to the customer playback devices after determining that one of the QAM broadcast channel, or VOD channel or SDV delivery channel has been established to deliver the content corresponding to the program. In some embodiments the IP content server 107 is configured to terminate, as part of terminating at least some of the unicast IP streams, the unicast IP streams being used to deliver the program to customer premise locations that include a gateway device such as gateway device 300 which can receive the program via the established QAM broadast program channel or the SDV content delivery channel. In some such embodiments the gateway device does not terminate the unicast IP streams being used to deliver the program to customer premise locations that do not include a gateway device.

Similar process is illustrated in steps 250 through 268 for the other IP playback devices at the customer premise 104 which switch to receive the program content from the gateway device 122. In step 250 the gateway device 122 sends a command to the IP STB 114 instructing the IP STB 114 to switch from receiving content from the IP content server 107 to receiving the program content from the gateway device 122 over the home network 121. In step 252 the IP STB 114 receives and processes the command. In some embodiments the IP STB 114 also sends an acknowledgment signal to the gateway device 122 confirming that it is ready to start receiving the content from the gateway device 122. In step 254 the gateway device 122 generates a unicast IP stream for delivering at least a portion of the second portion of the program to the IP STB 114 and sends the generated unicast IP stream over the home network 121 to the IP STB 114. In some embodiments in step 254 the gateway device 122 generates unicast packets from said recovered second portion of the program and transmits at least some of said unicast packets to the IP STB 114. In some embodiments generating unicast packets from the recovered second portion of the program includes coding the recovered content according to a second coding standard supported by the IP STB 114 and packetizing recovered content coded according to the second coding standard. In various embodiments transmitting at least some of said unicast packets to the IP STB 114 includes streaming unicast packets including recovered content coded according to said second coding standard to the IP STB 114.

In step 256 the IP STB 114 starts receiving the unicast IP content stream delivering packets generated from the recovered second portion of the program over the home network 121 from the gateway device 122. Thus in step 256 the IP STB 114 switches from outputting the content received from the IP content server 107 to outputting the program content received over the home network 121 from the gateway device 122. Outputting the content includes, e.g., outputting the program content on a display device, e.g., display 116 which may be a TV. Further in step 256 the IP STB 114 sends a notification over the cable network 161 to the IP content server 107 notifying the IP content server 107 that the IP STB 114 has started receiving the program from the gateway device 122. In step 258 the IP content server 107 receives and processes the notification signal and terminates the unicast IP stream being supplied to the IP STB 114.

In step 260 the gateway device 122 sends a command to the IP STB 110 instructing the IP STB 110 to switch from receiving content from the IP content server 107 to receiving the program content from the gateway device 122 over the home network 121. In step 262 the IP STB 110 receives and processes the command. In some embodiments the IP STB 110 also sends an acknowledgment signal to the gateway device 122 confirming that it is ready to start receiving the content from the gateway device 122. In step 264 the gateway device 122 generates a unicast IP stream for delivering at least a portion of the second portion of the program and sends the generated unicast IP stream over the home network 121 to the IP STB 110. In some embodiments in step 264 the gateway device 122 generates unicast packets from said recovered second portion of the program and transmits at least some of said unicast packets to the IP STB 110. In some embodiments generating unicast packets from the recovered second portion of the program includes coding the recovered content according to a coding standard supported by the IP STB 110 and packetizing recovered content coded according to that coding standard. In various embodiments transmitting at least some of said unicast packets to the IP STB 110 includes streaming unicast packets including recovered content coded according to said second coding standard to the IP STB 110.

In step 266 the IP STB 110 starts receiving the unicast IP content stream delivering packets generated from the recovered second portion of the program over the home network 121 from the gateway device 122. In step 266 the IP STB 110 switches from outputting the content received from the IP content server 107 to outputting the program content received over the home network 121 from the gateway device 122. Outputting the content includes, e.g., outputting the program content on a display device, e.g., display 112 which may be a TV. Further in step 266 the IP STB 110 sends a notification over the cable network 161 to the IP content server 107 notifying the IP content server 107 that the IP STB 110 has started receiving the program from the gateway device 122. In step 268 the IP content server 107 receives and processes the notification signal and terminates the unicast IP stream being supplied to the IP STB 110.

Thus it should be appreciated from the above example that terminating various unicast IP streams supplying the same content over the cable network 161 reduces traffic congestion and load on the cable network and allows for more efficient use of the network resources.

In various embodiments prior to sending a supply request (as illustrated in step 226) the IP content server 107 determines the number of playback devices in a region receiving content corresponding to the program via unicast content delivery; and makes a decision to establish one of a QAM broadcast program channel, a SDV content delivery channel or a VOD delivery channel for delivering a second portion of the program based on the number of playback devices in a region receiving content corresponding to said program via unicast content delivery. For example, the decision to establish one of a QAM broadcast program channel, a VOD delivery channel or a SDV content delivery channel for delivering program content may be, and in some embodiments is, is made when the number of playback devices in a region receiving content corresponding to the program via unicast content streams exceeds a threshold number. In some embodiments the decision to establish the one of a QAM broadcast program channel or a SDV content delivery channel is further based on network congestion. In some embodiments the decision to establish the one of a QAM broadcast program channel, a VOD delivery channel or a SDV content delivery channel is made when network congestion is detected in the region and the number of playback devices in the region receiving content via unicast content streams exceeds a threshold number. In some embodiments the threshold number is predetermined.

In some embodiments network congestion is determined, e.g., by the IP content server 107 or the control server 152, based on at least one of: signals indicating unicast packet transmission delays or signals requesting that the server transmitting unicast packets switch to using a lower transmission data rate. The playback devices may signal headend or the IP content server to begin using a lower rate given network congestion and the IP content server or the control server can then determine from multiple such requests in a particular region that a particular network region is encountering network congestion.

Figure 3:
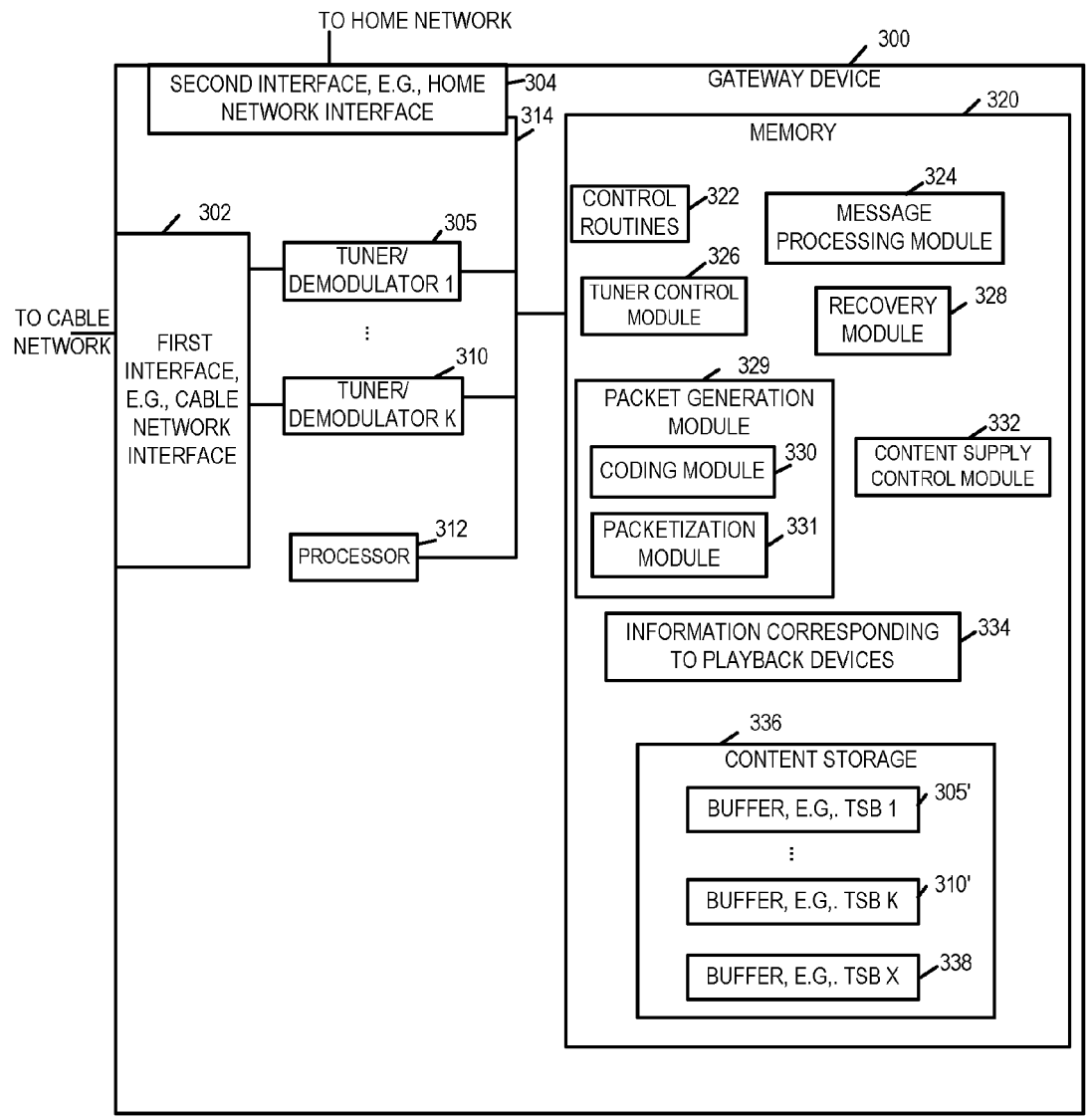
FIG. 3 illustrates an exemplary gateway communications device implemented in accordance with some exemplary embodiments.

FIG. 3 illustrates an exemplary gateway communications device 300 and various elements of the gateway device in greater detail. The exemplary gateway communications device 300 can be used as any one of the gateway devices (122, 142) shown in FIGS. 1 and 2. As discussed below, in accordance with the features of some embodiments the exemplary gateway device 300 provides unicast IP streams delivering program content to IP content playback devices over home network thereby obviating the need for the content playback devices to receive individual unicast content streams over the cable network from a content server. For the purpose of discussion consider that the gateway device is located at a customer premise including a plurality of IP devices which receive a first portion of a program via unicast IP streams from the IP content server 107. In accordance with the features of some embodiments the exemplary gateway device 300 is configured to receive a second portion of the program over a QAM broadcast program channel, a VOD delivery channel or an SDV content delivery channel and to generate unicast IP streams for delivering at least a portion of the second portion of the program to one or more playback devices in the plurality of playback devices. In some embodiments the gateway device receives program content over one of a QAM broadcast channel, SDV delivery channel or VOD delivery channel, creates new unicast streams and sends the unicast content streams over the home network to playback devices which previously received the content streams directly from a content server. In some embodiments as part of the process the gateway device demodulates and/or decodes the received program content and then re-encodes and packetizes the content. The content may be re-encoded based on the destination playback device with different playback devices receiving content which is coded differently, e.g., based on the codecs they support and/or the bandwidth, data rates etc., they can support.

As shown, the gateway device 300 includes a first interface 302, e.g., cable network interface, a second interface 304, e.g., home network interface, a plurality of tuner/demodulator pairs including tuner/demodulator pair 1 305 through tuner/demodulator K 310, a processor 312, and a storage device, e.g. a memory 320, coupled together via a bus 314. The various elements of the gateway device 300 can exchange data and information over the bus 314.

Via the first interface 302, the gateway device 302 can exchange signals and/or information with other devices and/or system elements such as the servers in the network headend 102, via the first network, e.g., cable network 161. The first interface 302 supports the receipt and/or transmission of content, and/or other information from/to different servers, e.g., the BFS, SDV server, etc. In various embodiments the first interface includes a receiver and a transmitter to receive and transmit content respectively, over the first network 161.

Each tuner-demodulator pair in the plurality of tuner/demodulator pairs 305 through 310 is capable of tuning to a frequency band to receive programming content and demodulating the received content and/or information. The tuner/demodulator pairs 305 through 310 work under the control of processor 312 and the tuner control module 330.

Via the second interface 304, e.g., home network interface, the gateway device 300 can exchange signals and/or information with other various customer premise equipments such as, e.g., the content playback devices 110, 114, and 118 at customer premise 104, via the second network, e.g., home network 121. The second interface 304 supports the receipt and/or transmission of content, and/or other information over the home network 121 from/to the various custom premise equipments. For example in various embodiments a second portion of a program content is supplied to various content playback devices over the home network 121 via the home network interface 304 in accordance with the features of various embodiments of the invention.

The processor 312, e.g., a CPU, executes routines 322 and one or more modules and controls the gateway device 300 to operate in accordance with the invention. The processor 312 is responsible for controlling the general operation of the gateway device 300. Thus to control the gateway device 300, the processor 312 uses information, various modules and/or routines including instructions stored in memory 320.

In addition to the routines 322, the memory 320 includes a message processing module 324, a tuner control module 326, a recovery module 328, a packet generation module 329, content supply control module 332, information corresponding to playback devices 334, and a content storage 336.

Routines 322 include communications routines and/or device control routines. The message processing module 324 is configured to process various messages and/or signals received by the gateway device 300. The received messages and/or signals include messages and/or signals received from headend 102 and from the content playback devices. For example the message processing module 134 receives a message from the control server in the headend 102 to tune to a given channel to start receiving program content and supply at least a portion of the received program content to one or more playback devices located at the customer premise where gateway 300 is located. The gateway device 300 processes the received messages and provides information to the processor 312 and/or the one or more other modules to take further action in response to the received messages.

The tuner control module 326 controls the tuner-demodulator pairs by providing them with information and/or parameters needed to tune to a given channel, e.g., one of a QAM broadcast channel, SDV delivery channel, or VOD delivery channel, to receive program content at a given time. In some embodiments the tuner control module 326 manages the allocation of tuner-demodulator pairs to one or more content playback devices and keeps track of which tuner-demodulators are available at a given time and which ones are in use. In some embodiments the tuner control module 326 receives tuning information and/or other parameters from the message processing module 324 which receives and processes a message, e.g., command sent in step 234, including tuning information from the headend 102. The tuning information and/or other parameters are then used by the tuner control module 326 to control the operation of the tuner-demodulators.

In various embodiments gateway device 300 receives, e.g., via a receiver in the first interface 302, a second portion of a program over one of the QAM broadcast program channel, VOD channel, or said SDV content delivery channel established by the headend 102. In various embodiments the received second portion of the program is then stored in one of a plurality of buffers 305' through 310' in the memory 320. The recovery module 328 is configured to recover the program content, e.g., second portion of the program, received via one of the QAM broadcast program channel, VOD channel, or said SDV content delivery channel.

The packet generation module 329 is responsible for generating unicast packets from the recovered second portion of the program for the content playback devices in accordance with the invention. In various embodiments the packet generation module 329 includes a coding module 330 and a packetization module 331. The coding module 330 is configured to encode the recovered content according the coding standards supported by the content playback devices to which the generated unicast packets are to be provided. For example, if the gateway device 300 is to supply program content to a first playback device which supports a first coding standard and to a second playback device which supports a second coding standard, the coding module 330 will encode the content to be provided to the first playback device in accordance with the first coding standard while encoding the content to be provided to the second playback device in accordance with the second coding standard. The information regarding the playback devices including information about supported coding standards, data rates, physical device addresses etc., corresponding to the playback devices at the customer premise where gateway 300 is located is obtained by the gateway device 300 and stored as information 334 in the memory. The packetization module 331 is configured to packetize the recovered content coded by the coding module 330 in accordance with the coding standard supported by the playback device to which the packets are to be transmitted. Thus in the above example the packetizing module is configured to packetize recovered content coded according to said first coding standard and packetize recovered content coded according to said second coding standard. Thus the gateway device 300 generates unicast IP streams for delivering at least a portion of the program to one or more playback devices in a plurality of playback devices located at said first customer premise.

The content supply control module 332 controls the supply of program content to the content playback devices over the home network via the second interface 304. The content supply control module 332 controls a transmitter in the second interface 304 to transmit at least some of the generated unicast packets to one or more playback devices. For example, if a first set of unicast packets is generated for the first playback device and a second set of unicast packets is generated for the second playback device, the content supply module 332 controls transmissions of at least some of the first set of unicast packets to the first playback device and at least some of the second set of unicast packets to the second playback device over the home network. In some embodiments the content supply control module 332 is also responsive to a stop content message which instructs the gateway device 300 to stop supplying the program content over the home network to an identified playback device.

The content storage 336 includes a plurality of buffers for storing program content. The content storage 336 includes buffers 1 305' through K 310' corresponding to the tuner-demodulator pairs 1 305 through K 310'. In some embodiments the one or more buffers are used for storing the program content received via the first interface 302 over one of the QAM broadcast program channel, SDV content delivery channel or the VOD content delivery channel. In some embodiments the received program content is subjected to further processing, e.g., recovery, coding, packetization etc., to generate IP content streams suitable for delivering to one or more content playback devices at the customer premise.

Figure 4:
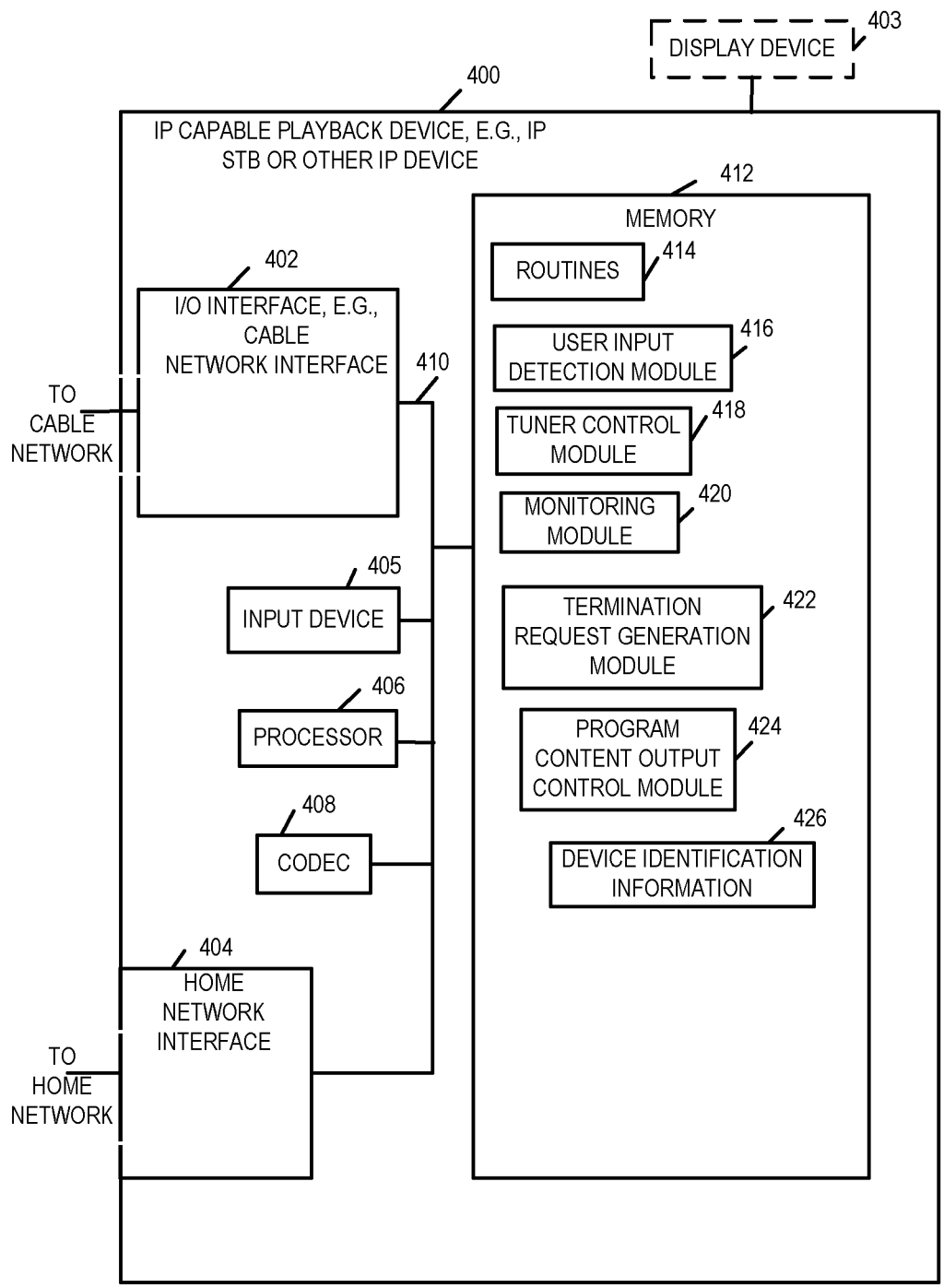
FIG. 4 illustrates an exemplary IP content playback device, e.g., an IP set top box, implemented in accordance with one exemplary embodiment.

FIG. 4 illustrates an exemplary IP content playback device 400, e.g., an IP set top box or another IP device capable of content playback, implemented in accordance with one exemplary embodiment. The content playback device 400 may be used as any one of the IP STBs or IP devices shown in any of the previous figures.

As shown, the content playback device 400 includes an Input/Output (I/O) interface 402, a home network interface 404, an input device 405, a processor 406, a codec (Coder/Decoder) 408, and a memory 412 coupled together via a bus 410. The various elements of the content playback device 400 can exchange data and information over the bus 410. In some embodiments, IP content playback device is coupled to a display device 403, e.g. a monitor and/or a Television (TV). In some other embodiments a display device may be included in the content playback device 400, e.g., such as a display screen of a cell phone or tablet device (e.g., iPAD).

Via the I/O interface 402, the content playback device 400 can exchange signals and/or information with other devices and/or system elements such as IP content server 107 and the servers in the network headend/hubsite 102, over the cable network 161. Thus the I/O interface 402 supports the receipt and/or transmission of content and/or other information from/to different devices and servers located outside the customer premise, e.g., such as IP content server 107 or the servers in the network headend/hubsite 102. The I/O interface may, and in some embodiments does, include an built-in cable modem. In addition, the I/O interface 402 in some embodiments also includes, e.g., an infrared signal receiver to receive signals from a user remote control device. Thus in some embodiments the I/O module 402 may include, in addition to a cable network interface, an IR or radio interface for receiving signals from a remote control device.

Via the home network interface 404 the content playback device 400 can exchange signals and/or information with other customer premise equipments such as the gateway device 300. The home interface 404 supports the receipt and/or transmission of content, and/or other information over the home network 121 from/to the gateway device 300. For example in various embodiments at least a portion of program content is supplied by the gateway device 300 to the IP content playback device 400 over the home network 121 via the home network interface 404 in accordance with the features of various embodiments of the invention.

The input device 405 may be a keypad, touch screen, and/or a microphone for receiving and processing voice input commands. The processor 406, e.g., a CPU, executes routines 514 and one or more modules and controls the playback device 500 to operate in accordance with the invention. The processor 406 is responsible for controlling the general operation of the IP playback device 400 including, e.g., presentation of information and/or programs for display. To control the device 400, the processor 406 uses information, various modules and/or routines including instructions stored in memory 412. The Codec 408 is implemented as a module and is capable of performing encoding and/or decoding operations on a digital data stream or signal.

In addition to the routines 414, the memory 412 includes a user input detection module 416, a tuner control module 418, a monitoring module 420, a program content presentation module 426, a determination module 428, and device identification information 442.

Routines 414 include communications routines and/or device control routines. User input detection module 416 detects a user input, e.g., input from a user received by the content playback device 400. The user input may be sent by a control device such as a remote control, or by other means, e.g., selecting an option by pressing a button on the IP device 400 or an icon on a touch screen etc. User input signals from a remote control may be received via I/O interface 402. The user input detection module 416 determines, on receipt of an input, e.g., a control signal providing user input, what type of selection has been made by the user, e.g., a channel selection instructing to tune to a specific channel, a program guide selection, or another input.

The tuner control module 418 is configured to tune to a frequency corresponding to a program channel to be viewed, e.g., a user selected channel. The monitoring module 420 is configured to monitor to detect a switch command from a gateway device, e.g., gateway device 300, instructing the IP content playback device 400 to switch from receiving content from the IP content server 107 to receiving content from the gateway device as discussed in steps 240 and 242 of FIG. 2. Upon receiving the switch command, the monitoring module 420 provides the information to the processor 406 which control the IP playback device 400 to switch from receiving content from the IP content server 107 and start receiving content from the gateway device 300.

The termination request generation module 422 is configured to generate an IP stream termination request for the IP content server 107 to terminate the unicast IP stream being supplied to the IP playback device 400. The IP content server 107, upon receipt of a termination request from the IP playback device 400, terminates the unicast IP stream being supplied to the IP playback device 400.

The program content output control module 426 is configured to control the presentation and playback of program content from the playback device 400 to the user, e.g., on the display device 403. For example during normal content playback operation the program content output control module 424 controls the playback device to output a first portion of a selected program received via an IP stream unicast over a first network, e.g., cable network, from a content server, e.g., IP content server. When a switch command is received and the IP playback device 400 starts receiving a second portion of the program content from the gateway device 300, the program content output control module 424 controls the playback device 400 to switch from outputting program content received via the IP stream from the IP content server 107, to outputting program content received from the gateway device 300 over the home network 121.

In some embodiments, one or more of the various modules discussed above work in coordination, e.g., with operations being merged to perform a function, to produce a desired output in accordance with the exemplary methods of the invention.

The device identification information 426 may include, e.g., Media Access Control (MAC) address of the playback device 400 or some other identifier identifying the playback device 400.

An exemplary content delivery method in accordance with one embodiment comprises: supplying a first portion of a program to a plurality of playback devices via unicast IP streams directed to said playback devices, establishing one of a QAM broadcast program channel or a SDV content delivery channel for delivering a second portion of said program, and terminating at least some of said unicast IP streams after establishing said QAM broadcast program channel or SDV content delivery channel.

In some embodiments terminating at least some of said unicast IP streams includes terminating unicast IP streams being used to deliver said program to customer premise locations that include a gateway device and which receive said QAM broadcast program channel or SDV content delivery channel.

In some embodiments the exemplary method further includes operating a gateway device located at a first customer premise to receive the second portion of said program over said QAM broadcast program channel or said SDV content delivery channel and to generate unicast IP streams for delivering at least a portion of said second portion of said program to one or more playback devices in said plurality of playback devices, said one or more playback devices being located at said first customer premise.

In various embodiments the gateway device includes modules for content coding and packetization of coded content. In some embodiments the exemplary method further comprises operating the gateway device to: receive the second portion of said program, recover said second portion of said program from content received via said QAM broadcast program channel or SDV content delivery channel, generate unicast packets from said recovered second portion of said program, and transmit at least some of said unicast packets to a first playback device, said first play back device being one of said plurality of playback devices and being located at a first customer premise location at which said hydra device is located.

In some embodiments generating unicast packets from said recovered second portion of said program includes: coding said recovered content according to a first coding standard supported by said first playback, packetizing recovered content coded according to said first coding standard, coding said recovered content according to a second coding standard supported by a second playback device located at the first customer premise location; and packetizing recovered content coded according to the second coding standard.

In some embodiments transmitting at least some of said unicast packets to said first playback device includes streaming unicast packets including recovered content coded accordingly to said first coding standard to said first playback device. In some embodiments the method further includes operating the gateway device to stream unicast packets including recovered content coded according to said second coding standard to a second playback device at the first customer premise location which uses said second coding standard.

In some embodiments the method further includes determining the number of playback devices in a region receiving content corresponding to said program via unicast content delivery; and making a decision to establish said one of a QAM broadcast program channel or a SDV content delivery channel for delivering a second portion of said program based on the number of playback devices in a region receiving content corresponding to said program via unicast content delivery.

In some embodiments the step of making a decision to establish said one of a QAM broadcast program channel or a SDV content delivery channel is further based on network congestion. In some embodiments the step of making a decision to establish said one of a QAM broadcast program channel or a SDV content delivery channel is a decision to establish said one of a QAM broadcast program channel or a SDV content delivery channel when network congestion is detected in the region and the number of playback devices in the region receiving content exceeds a threshold number. In some embodiments the threshold number is predetermined.

In some embodiments the method further includes determining network congestion based on at least one of: signals indicating unicast packet transmission delays or signals requesting that the server transmitting unicast packets switch to using a lower transmission data rate. The devices may signal headend or CMTS (cable modem termination system) to begin using a lower rate given network congestion and the control system can then determine from multiple such requests in a particular region that a particular network region is encountering network congestion]

In some embodiments the content playback devices are IP capable devices which receive program content from an IP capable content server. In some embodiments the gateway device receives the program content from a network source e.g., a content server in the cable headend, hubsite or a switched digital video source, which is different from the IP capable content server. In some embodiments the network source is one of a broadcast file server, a video on-demand (VOD) server or a switched digital video content server. In some embodiments the first network is a cable network and the second network is an Ethernet network.

An exemplary content delivery system in accordance with one embodiment comprises: an IP content server configured to supply a first portion of a program to a plurality of playback devices via unicast IP streams directed to said playback devices; and a control server configured to control a content server to establish one of a QAM broadcast program channel or a SDV content delivery channel for delivering a second portion of said program. In various embodiments the IP content server is further configured to terminate at least some of said unicast IP streams after determining that said QAM broadcast program channel or SDV content delivery channel has been established. In some embodiments the control server receives a request to establish one of a QAM broadcast program channel, or a SDV delivery channel, or a VOD delivery channel for delivering a second portion of said program. In some embodiments in response to receiving the request the control server controls a broadcast file server (BFS) to establish a QAM broadcast program channel for delivering a second portion of said program. In some embodiments in response to receiving the request the control server controls an SDV server in the system to establish a SDV content delivery channel for delivering a second portion of said program. In some embodiments in response to receiving the request the control server controls a VOD server to establish a VOD delivery channel for delivering a second portion of said program.

In various embodiments the content server is configured to terminate, as part of being configured to terminate at least some of said unicast IP streams, unicast IP streams being used to deliver said program to customer premise locations that include a gateway device and which receive the QAM broadcast program channel or SDV content delivery channel.

In various embodiments the system further includes a gateway device located at a first customer premise, said gateway device being configured to receive said second portion of said program over said QAM broadcast program channel or said SDV content delivery channel and to generate unicast IP streams for delivering at least a portion of said second portion of said program to one or more playback devices in said plurality of playback devices, said one or more playback devices being located at said first customer premise.

In some embodiments the gateway device includes: a first interface including a receiver configured to receive said second portion of said program; a recovery module configured to recover said second portion of said program from content received via said QAM broadcast program channel or SDV content delivery channel; a generation module configured to generate unicast packets from said recovered second portion of said program; and a second interface including a transmitter configured to transmit at least some of said unicast packets to a first playback device, said first play back device being one of said plurality of playback devices and being located at a first customer premise location at which said gateway device is located.

In some embodiments the generation module includes: a coding module configured to encode said recovered content according to a first coding standard supported by said first playback; and a packetization module configured to packetize recovered content coded according to said first coding standard. In some embodiments the coding module is further configured to encode said recovered content according to a second coding standard supported by a second playback device located at said first customer premise location. In some embodiments the packetization module is further configured to packetize recovered content coded according to said second coding standard.

In some embodiments the transmitter is configured to stream unicast packets including recovered content coded according to said first coding standard to said first playback device as part of transmitting at least some of said unicast packets to said first playback device. In some embodiments the transmitter is further configured to stream unicast packets including recovered content coded according to said second coding standard to the second playback device at said first customer premise location which uses said second coding standard.

In various embodiments the system further includes a tracking module configured to track and determine the number of playback devices in a region receiving content corresponding to a program via unicast content delivery; and a decision module configured to make a decision whether said one of a QAM broadcast program channel or a SDV content delivery channel for delivering the second portion of said program should be established based on the number of playback devices in the region receiving content corresponding to said program via unicast content delivery. In some embodiments the decision module is configured to make said decision whether said one of a QAM broadcast program channel or a SDV content delivery channel should be established further based on network congestion. In some embodiments the decision module decides that said one of a QAM broadcast program channel or a SDV content delivery channel should be established when network congestion is detected in the region and the number of playback devices in the region receiving content exceeds a threshold number.

In various embodiments the system further includes a congestion determination module configured to determine network congestion based on at least one of: signals indicating unicast packet transmission delays or signals requesting that the server transmitting unicast packets switch to using a lower transmission data rate.

Various features of the present invention facilitate avoiding heavy network congestion, for example, during planned and/or unplanned events as well as in general. Consider for example planned events such as the Super Bowl, Soccer world cup, or State of Union Address or unplanned events such as 911 or devastating earthquakes, storms in the Capitol (aka 'spikes') lead subscribers to tune to very limited but well known channels and remain very close to real time. If not managed carefully, these spikes in viewing ship of video over IP content will cause the video access network to blindly unicast literally identical copies of the same content to a large percentage of IP capable playback devices such as IP STBs on a given serving group. Consequently, spikes create sudden and congested traffic over known if not limited resources and thus some subscribers will experience impaired viewing experience and may even possibly experience outage of video over IP service.

The features of various embodiments of the present invention ensure the robustness of video over IP (VoIP) services by means of intelligent or just in time bandwidth management of QAM resources made available by existing the video access network (video over IP via DOCSIS channel or QAM-based video) and thus optimizing viewing experience by minimizing traffic congestion.

In some embodiments when IP playback devices, e.g., IP STBs, iPAD etc., experience or are informed by the network about incidents of 'spikes', the IP playback devices cease to receive video over IP service and request video content over home network where a QAM-based device, e.g., a local QAM gateway device, will accordingly produce the same content by tuning to the same broadcast or switch channel. When the video access network detect or anticipate incidents of spikes, the video access network detect intelligently establishes video sessions by leveraging known and well established technologies, e.g., SDV technology, and communicate to streaming playback devices that they need to get the same content from the local QAM based device instead, which in many embodiments is located at the customer premise where the playback devices are located. The local gateway device delivers the program content to the various IP playback devices at the over a home network. The features of the invention can also be used for IP content playback devices that experience impaired connectivity to the video over IP network and have the ability to seek and receive the same content from a local QAM based gateway device/server instead.

An example in which the methods and apparatus of the present invention may be used will now be discussed. Consider a content delivery system where Real-time streaming data (RT D) is being delivered to IP playback devices, e.g., IP STBs, via DOCSIS, e.g., over the cable network, where RT D can be video, audio, or any multimedia information that are latency sensitive in nature. In one case, only one IP device is interested in the RT D stream, so the streaming method from the network, e.g., from an IP content server in the network, to the only interested device is unicast, which is more network efficient than setting up a QAM based SDV channel. For each additional device that is also interested in the RT D stream, an additional unicast stream of the same RT D content is added to the network. At some point, a threshold will be reached when the number devices interested in receiving the RT D stream becomes large enough that it becomes beneficial for the network to set up a QAM based SDV channel with the RT D stream and re-negotiate with all devices interested in receiving the RT D stream to obtain the RT D stream from a local device, e.g., an in-home QAM-based server, instead. Once all the interested devices obtain their RT D streaming content from the local QAM-based server, the network will save network bandwidth and power consumption for additional network services.

The above examples are provided to facilitate understanding of some of the many various embodiments supported by the methods and apparatus of the invention and are not intended to be limiting in nature.

In various embodiments system elements described herein are implemented using one or more modules which are used to perform the steps corresponding to one or more methods of the present invention, for example, supplying a first portion of a program, to a plurality of customer devices via unicast IP streams, establishing one of a QAM broadcast program channel, an SDV content delivery channel or a VOD delivery channel for delivering a second portion of the program, etc.

In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A content delivery method, comprising:
   supplying over a first network, from an IP (Internet Protocol) server located outside a first customer premise, a first portion of a program to a plurality of playback devices via unicast IP streams directed to said playback devices, said unicast IP streams including a first unicast IP stream directed to a first playback device, said first unicast IP stream including said first portion of said program;
   establishing between a second server and at least a gateway device located at the first customer premise one of a broadcast program channel or a SDV (Switched Digital Video) content delivery channel for delivering a second portion of said program; and
   terminating said first unicast IP stream, without terminating unicast IP streams being used to deliver the program to at least some customer premise locations that do not include a gateway, after start of delivery of the second portion of the program from the gateway device to the first customer premise device via said broadcast program channel or SDV content delivery channel.

2. The method of claim 1, wherein said terminating of said first unicast IP stream is in response to a notification from said first playback device notifying the IP server that the first playback device has started receiving the program from the gateway device.

3. The method of claim 1, further comprising:
   operating the gateway device to receive content corresponding to the second portion of the program from the second server at a higher data rate than said first playback device receives content corresponding to said program from said IP server; and
   operating said gateway device to generate a third unicast IP stream for delivering at least a portion of said second portion of said program to a second playback device in said plurality of playback devices.

4. The method of claim 1, wherein said gateway device includes modules for content coding and packetization of coded content, the method further comprising:
   operating the gateway device to:
      recover said second portion of said program from content received via said broadcast program channel or SDV content delivery channel;

generate unicast packets from said recovered second portion of said program as part of generating the second unicast IP stream for delivery to said first playback device; and transmit at least some of said unicast packets to said first playback device.

5. The method of claim 4, further comprising:
operating the gateway device to transcode said second portion of said program from another coding format to a first coding format;
operating the gateway device to generate said second unicast IP stream by packetizing content coded according to said first coding format;
operating the gateway device to generate a third unicast IP stream for delivery to a second playback device, generating said third unicast IP stream including transcoding said content according to a second coding format supported by said second playback device located at said first customer premise location; and
packetizing content coded according to said second coding format.

6. The method of claim 5,
wherein transmitting at least some of said unicast packets to said first playback device includes:
streaming unicast packets including content coded according to
said first coding format to said first playback device; and
wherein said method further includes:
streaming unicast packets including recovered content coded according to said second coding format to the second playback device at said first customer premise location which uses said second coding format.

7. The method of claim 1, further comprising:
determining the number of playback devices in a region or service group receiving content corresponding to said program via unicast content delivery; and
making a decision to establish said one of a broadcast program channel or a SDV content delivery channel for delivering the second portion of said program based on the number of playback devices in the region or service group receiving content corresponding to said program via unicast content delivery.

8. The method of claim 7, wherein said step of making a decision to establish said one of a broadcast program channel or a SDV content delivery channel is further based on network congestion.

9. The method of claim 7,
wherein said second server is a different device from said IP server and is located outside the first customer premise.

10. The method of claim 7, wherein said step of making a decision to establish said one of a broadcast program channel or a SDV content delivery channel is a decision to establish said one of a broadcast program channel or a SDV content delivery channel when network congestion is detected in the region or service group and the number of playback devices in the region or service group receiving content exceeds a threshold number.

11. The method of claim 9, further comprising:
determining network congestion based on at least one of:
signals indicating unicast packet transmission delays or signals requesting that the server transmitting unicast packets switch to using a lower transmission data rate.

12. A content delivery system, comprising:
an Internet Protocol (IP) content server located outside a first customer premise, said IP server being configured to supply over a first network a first portion of a program to a plurality of playback devices via unicast IP streams directed to said playback devices, said unicast IP streams including a first unicast IP stream directed to a first playback device, said first unicast IP stream including said first portion of said program coded in accordance with a first coding format supported by said first playback device;
a control server configured to control a content server to establish, between said content server and at least a gateway device located at the first customer premise, one of a broadcast program channel or a switched digital video (SDV) content delivery channel for delivering a second portion of said program;
a gateway device located at the first customer premise, said gateway device being configured to receive said second portion of said program over said broadcast program channel or said SDV content delivery channel and generate a unicast IP stream for delivery, over a second network which is different from said first network, to said first playback device; and
wherein said IP content server is further configured to terminate said first unicast IP stream, without terminating unicast IP streams being used to deliver the program to at least some customer premise locations that do not include a gateway, after start of delivery of the second portion of the program from the gateway device to the first customer premise device via said broadcast program channel or SDV content delivery channel.

13. The system of claim 12, wherein said IP content server is further configured to receive a notification from said first playback device notifying the IP content server that the first playback device has started receiving the program from the gateway device.

14. The system of claim 12,
wherein said gateway device is further configured to:
receive, via a receiver, content corresponding to the second portion of the program from the content server at a higher data rate than said first playback device receives content corresponding to said program from said IP content server; and
generate a third unicast IP stream for delivering at least a portion of said second portion of said program to a second playback device in said plurality of playback devices.

15. The system of claim 12, wherein said broadcast program channel is a QAM broadcast program channel; and
wherein said gateway device includes:
a first interface including a receiver configured to receive said second portion of said program;
a recovery module configured to recover said second portion of said program from content received via said QAM broadcast program channel or SDV content delivery channel;
a generation module configured to generate unicast packets from said recovered second portion of said program as part of generating said second unicast IP stream for delivery to said first playback device; and
a second interface including a transmitter configured to transmit at least some of said unicast packets to said first playback device, said first playback device being one of said plurality of playback devices and being located at a first customer premise location at which said gateway device is located.

16. The system of claim 15, wherein said generation module includes:

a coding module configured to encode said recovered content according to said first coding format supported by said first playback thereby transcoding said second portion of said program from another coding format to said first coding format; and a packetization module configured to packetize content coded according to said first coding format.

17. The system of claim 16, wherein said generation module is further configured to generate a third unicast IP stream for delivery to a second playback device; and wherein said coding module is further configured to encode said recovered content according to a second coding format supported by said second playback device located at said first customer premise location; and wherein said packetization module is further configured to packetize recovered content coded according to said second coding format.

18. A content delivery method, comprising:

supplying, from an IP server located outside a first customer premise, a first portion of a program to a plurality of playback devices via unicast internet protocol (IP) streams directed to said playback devices, said unicast IP streams including a first unicast IP stream directed to a first playback device, said first unicast IP stream including said first portion of said program coded in accordance with a first coding format supported by said first playback device;

establishing one of a QAM broadcast program channel or a switched digital video (SDV) content delivery channel for delivering a second portion of said program, said second portion of said program having been coded in accordance with another coding format which is different from said first coding format;

operating a gateway device located at the first customer premise to receive said second portion of said program over said QAM broadcast program channel or said SDV content delivery channel and generate a second unicast IP stream for delivery to said first playback device, generating said second unicast IP stream including transcoding said second portion of said program from said another coding format to said first coding format; and wherein the IP server terminates said first unicast IP stream, without terminating unicast IP streams being used to deliver the program to at least some customer premise locations that do not include a gateway, after start of delivery of the second portion of the program from the gateway device to the first customer premise device via said QAM broadcast program channel or SDV content delivery channel.

* * * * *